United States Patent [19]

Koda

[11] Patent Number: 4,559,710
[45] Date of Patent: Dec. 24, 1985

[54] METHOD OF CHECKING PALLETS OR ARTICLES TO BE WORKED BY AUTOMATICALLY MEASURING AVERAGE DIAMETER OF HOLE AND APPARATUS FOR PRACTICING SAME

[75] Inventor: Seido Koda, Mino, Japan

[73] Assignee: Osaka Kiko Kabushiki Kaisha, Osaka, Japan

[21] Appl. No.: 659,756

[22] Filed: Oct. 11, 1984

[30] Foreign Application Priority Data

Oct. 13, 1983 [JP] Japan ................................ 58-192247

[51] Int. Cl.⁴ .............................................. G01B 7/12
[52] U.S. Cl. ................................. 33/178 E; 33/143 L; 33/147 K
[58] Field of Search ............. 33/178 E, 178 R, 143 L, 33/147 K, 178 F, 174 Q

[56] References Cited

U.S. PATENT DOCUMENTS 3,921,300 11/1975 Cox et al. ........................ 33/178 E
4,262,425 4/1981 Sabato ............................ 33/178 E
4,339,879 7/1982 Selleri ............................. 33/147 K
4,443,947 4/1984 Possati et al. ...................... 33/178 E

FOREIGN PATENT DOCUMENTS 2075875 11/1981 United Kingdom ............. 33/178 E

*Primary Examiner*—Willis Little
*Attorney, Agent, or Firm*—Armstrong, Nikaido, Marmelstein & Kubovcik

[57]  ABSTRACT

The magnitude of a gap between each of three points on the inside circumferential surface of a reference hole of a reference hole block mounted on a pallet or each of three points on the inside circumferential surface of a hole of an article to be worked prior to working and the body of an apparatus for measuring a diameter of hole is detected by means of each of three displacement detecting elements mounted on the body of the apparatus for measuring the diameter of a hole, an average diameter of a hole to be measured being calculated by means of an operational amplifier circuit, and a pallet or an article to be worked being distinguished on the basis of the calculated value.

5 Claims, 9 Drawing Figures

METHOD OF CHECKING PALLETS OR ARTICLES TO BE WORKED BY AUTOMATICALLY MEASURING AVERAGE DIAMETER OF HOLE AND APPARATUS FOR PRACTICING SAME

BACKGROUND OF THE INVENTION

1. Field of the Invention

The present invention relates to a method of checking pallets or articles to be worked fed into a working process and an apparatus for practicing same, and more particularly to a method of checking pallets or articles to be worked and an apparatus for practicing same in which an average diameter of a hole of a pallet or an article to be worked automatically measured by means of three displacement detectors mounted on the body of an apparatus for measuring a diameter of a hole is used as a checking means.

2. Prior Arts

Various methods of measuring an average diameter of a hole of an article to be worked in a working process in a machining center are proposed and being practically used. One is a method of measuring an average diameter of a hole of an article to be worked by simultaneously bringing three displacement detectors into contact with the inside circumferential surface of said hole to be measured, as disclosed in the specification of U.S. Pat. No. 3191294. Another is a method of calculating a diameter of a hole, in which the whole measuring apparatus is displaced toward the direction of an axis of abscissa and the direction of an axis of ordinate of the hole from the central position of said hole in said hole of which a diameter is to be measured, the magnitude of the displacement of the measuring apparatus until a pointed end of a contact needle is brought into contact with the inside circumferential surface of the hole to be measured being detected, and a diameter of the hole is calculated from the magnitude of the displacement of said measuring apparatus in the direction of X-axis and that in the direction of the Y-axis, as disclosed in Japanese Patent Laid-Open No. Sho 49-20772 or Japanese Patent Laid-Open No. Sho 50-43580.

The three-point simultaneously contacting method is a method in which a measuring apparatus provided with a contact needle elastically projecting on the periphery of a cylindrical bar is inserted into a hole to be measured of an article to be worked, and a diameter of the hole is measured on the basis of whether the contact needle is withdrawn or not, but since it is difficult to set the projection of the contact needle to a large magnitude, this method has a disadvantage that a measuring range is limited. Accordingly, in order to apply this method to the measurement of various kinds of diameter of a hole, the large number of measuring apparatus must be prepared in accordance with diameters of a hole and a remarkable disadvantage is accompanied by mounting all of these measuring apparatus on a toolmagazine.

On the contrary, the second method is superior to the first method in that a measuring range is wide, so it is not necessary to always prepare a large number of measuring apparatus. According to this second method, it is, however, necessary to displace a measuring apparatus from the central position of a hole in the radial direction in the measurement of a diameter of a hole, so it takes a measuring time longer than that in the first method by a time required for the displacement of the measuring apparatus. In addition, according to this second method, since an average diameter of a hole of an article to be worked is calculated from the magnitude of the displacement of a measuring apparatus, it shows a disadvantage that an accuracy of measurement of a diameter of a hole is greatly dependent upon an accuracy of displacement of a measuring apparatus.

On the other hand, in order to smoothly practice an unattended continuous working by means of a machining center as above described, it is necessary to adopt a checking system which can correctly distinguish the characteristics of pallets or articles to be worked fed into said machining center. However, a checking means, which is practically usable, meeting such an object, and having a high accuracy of discrimination, has been hardly proposed heretofore. Described in more detail, in the practical mechanical working line, a plurality of pallets are fed into one machining center and an appointed pallet is called and then the NC program corresponding to the work for said pallet is called to carry out the appointed mechanical work. Since the operation of mounting an article to be worked on a pallet is manually carried out although the above described actions are all automatically carried out, the faculty for checking whether a pallet or an article to be worked correctly corresponds to a NC program or not is required. According to the conventional distinguishing-checking methods, a dog and the like mounted on a pallet have been detected by a limit switch and a pallet or an article to be worked placed on said pallet has been distinguished by the obtained two-value signal (ON-OFF). In this case, since the number of limit switches is increased with an increase of the number of pallets, a practical disadvantage has been found with respect to a large space required for mounting limit switches thereon. In addition, since the setting of a dog corresponding to said two-value signal is manually carried out, it takes an increasingly longer time to set a dog with an increase of the number of pallets, whereby the danger of missetting is increased.

SUMMARY OF THE INVENTION

It is a principal object of the present invention to provide a means for checking a pallet or an article to be worked by automatically measuring a diameter of the reference hole or a diameter of hole prior to working which can eliminate the above described disadvantages incidental to the conventional methods of distinguishing pallets or articles to be worked.

It is another principal object of the present invention to provide a means of automatically measuring an average diameter of hole by means of which the distinguishing performance for pallets or articles to be worked can be improved.

A method of checking pallets or articles to be worked according to the present invention consists in that the magnitude of a gap between each of three points on the inside circumferential surface of the reference hole of the reference hole block mounted on a pallet or each of three points on the inside circumferential surface of a hole of an article to be worked prior to working and the body of an apparatus for measuring a diameter of a hole is detected by means of each of three displacement detecting elements mounted on said body of said apparatus for measuring a diameter of a hole, an average diameter of a hole to be measured being calculated by means of an operational amplifier circuit, and a pallet or an article to be worked being distinguished on the basis of the calculated value.

According to the present invention, since a diameter of a hole of the reference hole block or an article to be worked is used as a parameter for distinguishing the characteristics, pallets or articles to be worked can be correctly distinguished. In the practice of the present invention, a large number of pallets or articles to be worked can be correctly and speedily distinguished, whereby they can be adapted to working programs. In addition, according to the present invention, they can be correctly distinguished without being influenced by an error of positioning a machining center (eccentricity).

Accordingly, the present invention exhibits remarkable effects in the improvement of an accuracy of discrimination of pallets or articles to be worked, the prevention of the production of bad articles due to the inadaptability of pallets or articles to be worked to working programs or the promotion of energy-saving in an unattended continuous operation.

DESCRIPTION OF THE PREFERRED EMBODIMENTS

Figure 1:
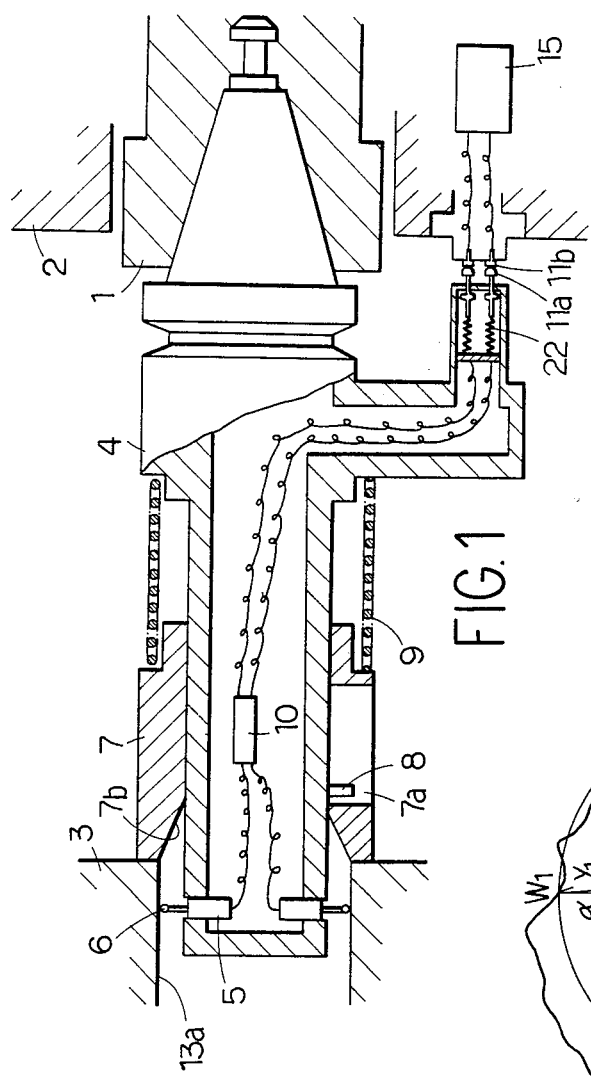
FIG. 1 is a vertical sectional view showing an apparatus for measuring an average diameter of a hole according to the present invention.

Referring now to FIG. 1 which is a sectional view showing an apparatus for automatically measuring a diameter of a hole used in the present invention, 1 designates a main spindle rotatably mounted on a main spindle head 2 of a machining center, 3 designating an article to be worked or to be measured, and 4 designating the body of an apparatus for measuring a diameter of a bored hole 13a of said article to be worked 3 which body has almost same shape as the conventional tools and is mounted on said main spindle 1. Said body 4 of said measuring apparatus is provided with three detectors 5 included in the pointed end portion thereof and detecting elements 6 of said detectors 5 are constructed so as to project and withdraw on the peripheral surface of said body 4. 7 designates a protection ring slidably engaged with the peripheral surface of the distal end of said body 4 of said measuring apparatus for protecting said detecting element 6, said protection ring 7 being constructed so as to function as the reference ring (master ring) in the measurement of a diameter of said hole to be worked also. Said protection ring 7 is usually forced forwardly of said body 4 by an elastic force of an elastic member 9 inserted between said protection ring 7 and said body 4 to be engaged by a stopper 8 mounted on the body 4 and extending into an elongated opening 7a. In addition, said protection ring 7 is provided with a tapered portion 7b on the inside circumferential surface of the pointed end portion thereof, said tapered portion 7b making said detecting element 6 withdraw inwardly of said body 4 in cooperation with an elastic force of said elastic member 9 to protect said detecting element 6. 10 designates an operational amplifier circuit provided inside or outside said body 4 of a measuring apparatus (in FIG. 1, the case where said operational amplifier circuit is provided inside said body is shown) for operationally treating displacement detecting signals from said detector 5 in accordance with an operational equation which will be described later. The value of a diameter of a hole and the position of the center of a hole calculated in said operational amplifier circuit are transferred to a controller 15 through a connecting terminal 11a projecting toward the main spindle side of said body 4 of said measuring apparatus and a connecting terminal 11b fixedly mounted on said main spindle head 2. In order to provide said body 4 of said measuring apparatus on said main spindle 1 and simultaneously automatically connect the above described electrical signal system, each of said connecting terminals 11a of said body 4 side is provided with the second elastic member 22 incorporated therein so that said connecting terminal 11a may be brought into close contact with said connecting terminal 11b by an elastic force of said elastic member 22 to electrically connect said operational amplifier circuit 10 with said controller 15. Thus displacement detecting signals are taken out of the system and function as a distinguishing medium for articles to be worked on pallets carrying such articles.

As above described, each of said connecting terminals 11a is provided slidably in the axial direction through said second elastic member 22 in an apparatus according to the present invention, so an abrasion resistant electrization is produced between said connecting terminal 11a and said connecting terminal 11b upon the provision of said connecting terminal 11a on said main spindle 1. Accordingly, noises resulting from the bad contact incidental to the conventional insertion plug type terminals can be completely prevented from generating.

Next, the action of an apparatus for automatically measuring a diameter of a hole and the position of the center of a hole with the construction as above described will be described with reference to the working program of a bored hole, to which the present invention was applied, shown in FIG. 2. Each of these processes is controlled automatically by means of a Numerical Control (NC) apparatus. At first, when a working program type of a NC apparatus is started, a boring bar (tool) is taken out of a tool magazine and mounted on said main spindle 1 by means of a tool-exchanging apparatus. On the completion of the provision of a tool, said main spindle 1 begins to rotate, said main shaft head 2 being displaced forwardly to begin the cutting feed action, and the cutting action being given to said article to be worked 3. When the working is completed, the rotation of said main spindle 1 is stopped, said main spindle head 2 being retreated, and a tool removed from said main spindle 1 by means of an automatic tool changing apparatus (ATC) being housed in a tool magazine.

Then said measuring apparatus 4 is taken out of said tool magazine and mounted on said main spindle 1 by means of said automatic tool changing apparatus (ATC) to which the provision of said measuring apparatus 4 was ordered. At this time, said connecting terminal 11a of said measuring apparatus side is brought into close contact with said connecting terminal 11b of said main spindle head side due to an elastic force of said elastic member 12 to be under the conditions that they are electrically connected with each other and the detection signals can be put out from said displacement detector 5. Subsequently, said main shaft head 2 is displaced forwardly in the same manner as above described to insert said detecting element 6 of said body 4 of said measuring apparatus into a bored hole 13a of said article 3 to be worked. In this case, the pointed end surface of said protection ring 7 is first brought into contact with the end surface of said article 3 to be worked a said body 4 passes into said bored hole 13a of said article 3 to be worked and then three detecting elements 6 are released from said protecting ring 7 to project toward the inside circumferential surface of said bored hole 13a by further inserting said body 4 into said bored hole 13 of said article 3 to be worked. As a result, said detecting element 6 is brought into contact with said inside circumferential surface of said bored hole 13a to transfer an output signal from said detecting element 6 to said operational amplifier circuit 10, whereby a diameter of said bored hole 13a is calculated. On the other hand, when said main spindle head 2 is retreated from said bored hole 13a, said protection ring 7 is held contacting with the end surface of said article 3 to be worked until said body 4 of said measuring apparatus reaches the appointed retreated position and said detecting element 6 is displaced along said tapered portion 7b of said protection ring 7, whereby said detecting element 6 is put in the inside of said body 4 of said measuring apparatus in order to protect it. After said protection ring 7 is returned to the former state said body 4 of said measuring apparatus is removed from said main spindle 1 and returned to a tool magazine by means of said automatic tool changing apparatus (ATC).

By the way, a signal of a diameter of said bored hole 13a calculated by means of said operational amplifier circuit 10 is transferred to said controller 15 through said connecting terminal 11a of said body 4 of said measuring apparatus and said connecting terminal 11b of said main spindle head side and then indicated by suitable indicating means such as a digital display and simultaneously the measured value of a diameter of said bored hole 13a is compared with the set value thereof. If the difference between the measured value of a diameter of a hole and the set value thereof is within a permissible range, the working is regarded as completed and then the subsequent working program is carried out. On the contrary, if it is outside of the permissible range (NG: No Good), the dimension of tool is corrected by a method such as the displacement of share point and then the above described second action is repeated.

Figure 3:
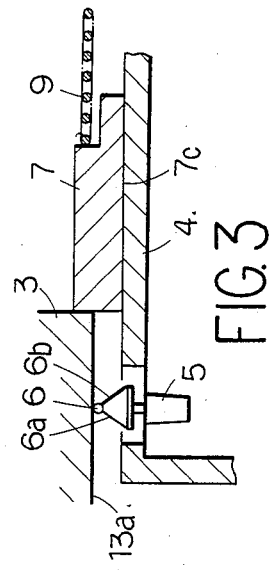
FIG. 3 is a partial vertical sectional view showing another preferred example of an apparatus for measuring an average diameter of a hole according to the present invention.
Figure 4:
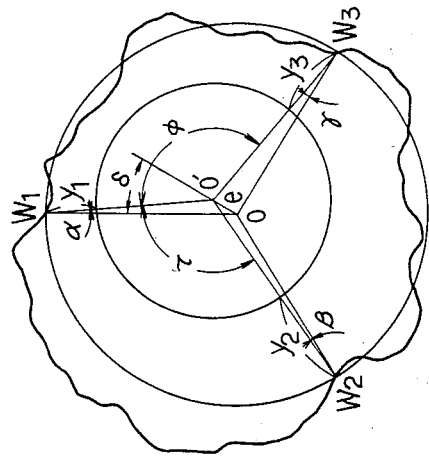
FIG. 4 is a diagram showing a method of measuring an average diameter of a hole.

In addition, the arrangement of said detecting element 6 and said tapered portion 7a of said protection ring 7 shown in FIG. 1 may be reversed as shown in FIG. 3. That is to say, said detecting element 6 itself may be provided with tapered portions 6a, 6b instead of said tapered portion 7a of said protection ring 7. Also this construction can ensure an accuracy of measurement equal to that in the preferred embodiment as shown in FIG. 1.

Further, in cases where it is required to especially improve an accuracy of measurement of a diameter of a bored hole, it is necessary to take an influence by room temperature into consideration in addition to the above described factors. In such cases, an error of measurement resulting from the expansion and contraction due to the fluctuation of room temperature can be substantially eliminated by finishing said inside circumferential surface 7c of said protection ring 7 with high accuracy, measuring first the reference diameter of the inside circumferential surface 7c of said protection ring 7 and then measuring a diameter of a bored hole 13a, and carrying out the subtracting operation of (a diameter of a bored hole—the reference diameter of the inside circumferential surface).

A method of measuring said diameter of a bored hole 13a with high accuracy will be in more detail described below with reference to the construction as shown in FIG. 1.

If the center of said measuring apparatus 4 agrees with the center of a bored hole 13a, an error of measurement resulting from the disagreement of the center of said measuring apparatus 4 with the center of said diameter 13a of a bored hole (eccentricity) is not produced. However, since the center of said measuring apparatus 4 does not agree with the center of a bored hole 13a due to error factors such as a positioning error of an axis for displacing a machining center and the thermal displacement in the usual working, an error of measurement resulting from the eccentricity between the center of said measuring apparatus 4 and the center of a bored hole 13a can not be disregarded according to circumstances.

Suppose that a diameter of a circle defined by three points to be measured $W_1$, $W_2$, $W_3$ on the inside circumferential surface of said bored hole 13a (hereinafter referred to as an average circle) is measured under the condition that there is an eccentricity e between the center $O'$ of a measuring apparatus and the center O of said bored hole 13a.

Said body 4 of said measuring apparatus is provided with three displacement detectors 5 incorporated therein with holding an arrangement angle of $\tau$, $\phi$, the gaps $y_1$, $y_2$, $y_3$ between said detectors 5 and said points to be measured $W_1$, $W_2$, $W_3$ of said hole 13 to be measured being measured by means of said detectors 5. Provided that a radius of said body 4 of said measuring apparatus is r, the relations $\overline{O'\,W_1} = Y_1 = r + y_1$; $\overline{O'\,W_2} = Y_2 = r + y_2$; $\overline{O'\,W_3} = Y_3 + r' + y_3$ are obtained.

However, since the quantities, which are practically required, are radii $\overline{O\,W_1}$, $\overline{O\,W_2}$, $\overline{O\,W_3}$, these parameters are expressed by the quantities of the gaps detected by means of the detectors and the quantities defined geometrically as follows:

$$\left. \begin{aligned} \overline{OW_1} &= Y_1 \cos \alpha + e \cos \delta \\ \overline{OW_2} &= Y_2 \cos \beta + e \cos \\ &\quad (\alpha - \beta + \tau + \delta) \\ \overline{OW_3} &= Y_3 \cos \gamma + e \cos \\ &\quad (-\alpha - \gamma + \phi + \delta) \end{aligned} \right\} \quad (1)$$

Provided that a radius of an average circle ($R_o$) is an arithmetic average of $\overline{OW_1}, \overline{OW_2}, \overline{OW_3}$, the following equation (2) is obtained:

$$R_o = \frac{1}{3}(\overline{OW_1} + \overline{OW_2} + \overline{OW_3}) \quad (2)$$

$$= \frac{1}{3}(Y_1 \cos \alpha + Y_2 \cos \beta + Y_3 \cos \gamma) +$$

$$\frac{e}{3}[\cos \delta + \cos(\alpha - \beta + \tau + \delta) +$$

$$\cos(-\alpha - \gamma + \phi - \delta)]$$

Provided that apex angles $\alpha, \beta, \gamma$ are minute to negligible extent, $$\cos \approx 1, \cos \approx 1, \cos \approx 1 \quad (3)$$

Accordingly, the equation (2) is simplified to obtain the following equation (4):

$$R_o = \tfrac{1}{3}(Y_1 = Y_2 + Y_3) \quad (4)$$

$$+ \frac{e}{3}[\cos \delta + \cos(\delta + \tau)$$

$$+ \cos(\phi - \delta)]$$

The second term in the right side of said equation (4) is an error term showing that the center O' of said body 4 of said measuring apparatus does not agree with the center O of said hole 13a to be measured.

In cases where an arithmetical average of radii $\overline{O'W_1} = Y_1, \overline{O'W_2} = Y_2, \overline{O'W_3} = Y_3$ detected by the usual measuring methods, that is to say detected at three points is adopted as a radius of said hole 13 to be measured, the following equation (5) holds good:

$$R'_o = \tfrac{1}{3}(Y_1 + Y_2 + Y_3) \quad (5)$$

The following equation (6) is obtained by comparing said equation (5) with said equation (2):

$$\Delta R_o = \frac{e}{3}[\cos \delta + \cos(\delta + \tau) \quad (6)$$

$$+ \cos(\phi + \delta)]$$

Accordingly, an error of measurement is produced. Although it is natural that $\Delta R_o = 0$ when the quantity of eccentricity $e = 0$, the quantity of eccentricity $e$ can not be practically disregarded because of error factors such as a positioning error of an exis for displacing a machining center and the thermal displacement in an on-the-machine measurement using a machining center and the like.

So, in order to eliminate an error term in said equation (4) and an error of measurement resulting from an eccentricity between the center of said body 4 of said measuring apparatus and the center of said hole 13a to be measured, the following method is used:

Average radii $\overline{OW_1}, \overline{OW_2}, \overline{OW_3}$ of said hole 13 to be measured are calculated by three detecting elements 6 in accordance with said equation (1) and then the sum total of these radii is calculated with a weight of 1:a:b (a, b are constants determined by the arrangement angles $\tau, \phi$) in accordance with the following equation (7):

$$\overline{OW_1} + a\overline{OW_2} + b\overline{OW_3} = (Y_1 + aY_2 + bY_3) + \quad (7)$$

$$e[\cos \delta (1 + a \cos \tau + b \cos \phi) -$$

$$\sin \delta (a \sin \tau - b \sin \phi)]$$

Then, if the arrangement angles $\tau, \phi$ of said detectors 5 and the weights a, b are selected so that the following equation (8) may hold good, the second term in the right side of said equation (4), that is to say an error term resulting from an eccentricity is eliminated and finally a radius $R_o$ of an average circle is given by the following equation (9):

$$\left. \begin{array}{l} 1 + a \cos \tau + b \cos \phi = 0 \\ a \sin \tau - b \sin \phi = 0 \end{array} \right\} \quad (8)$$

$$R_o = \frac{Y_1 + a Y_2 + b Y_3}{1 + a + b} \quad (9)$$

Accordingly, a diameter $D_o$ of said hole 13a to be measured is given by the following equation (10) obtained by multiplying said $R_o$ by two:

$$D_o = \frac{2(Y_1 + a Y_2 + b Y_3)}{1 + a + b} \quad (10)$$

According to the above described principle of measurement, the diameter $D_o$ of an average circle can be measured with high accuracy without being influenced by an eccentricity of the center of said body 4 of said measuring apparatus. Although for easy understanding the principle of measurement was above described for the cases where an inside diameter is measured, it will be easily understood that this method can be applied to the measurement of an outside diameter, too.

Next, the relation between arrangement angles $\tau, \phi$ of said detectors 5 and weights a, b in said equation (8) and the selecting condition of $\tau, \phi$ will be investigated.

Since four variables of $\tau, \phi, a, b$ are included in two equations of said equation (8), the relation between $\tau, \phi$ and a, b can be optionally selected. Once the combination of $\tau$ and $\phi$ is selected, weights a, b can be determined by the following equation (11):

$$\left. \begin{array}{l} a = -\dfrac{\sin \phi}{\sin(\tau + \phi)} \\ b = -\dfrac{\sin \tau}{\sin(\tau + \phi)} \end{array} \right\} \quad (11)$$

Then $\tau, \phi$ are expressed by the functions of a, b from said equation (11) to deduce the following relations (12):

$$\cos \tau = -\frac{1}{2a}(a^2 - b^2 + 1) \quad (12)$$

$$\cos \phi = \frac{1}{2b}(a^2 - b^2 + 1)$$

$$\sin \tau = \frac{1}{2a}\sqrt{-a^4 + 2a^2 b^2 - b^4 + 2a^2 + 2b^2 + 1}$$

$$\sin \phi = \frac{1}{2b}\sqrt{-a^4 + 2a^2 b^2 - b^4 + 2a^2 + 2b^2 + 1}$$

Then, provided that a>0 and b>0 and giving the condition that the absolute values of trigonometrical functions shown in said equation (12) are 1 or less, the following inequality (13) is deduced:

$$(a-b+1)(a+b-1)(a-b-1) \leq 0 \tag{13}$$

Figure 5:
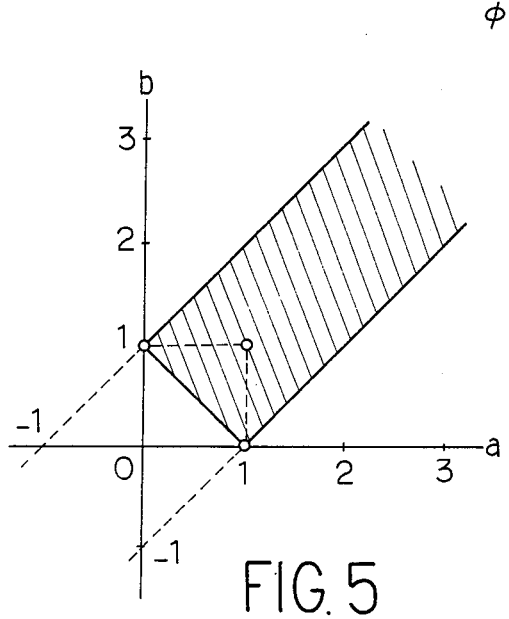
FIG. 5 is an orthogonal ordinate diagram showing a range of the weight a, b which can be adopted in a measuring method as shown in FIG. 4.
Figure 6:
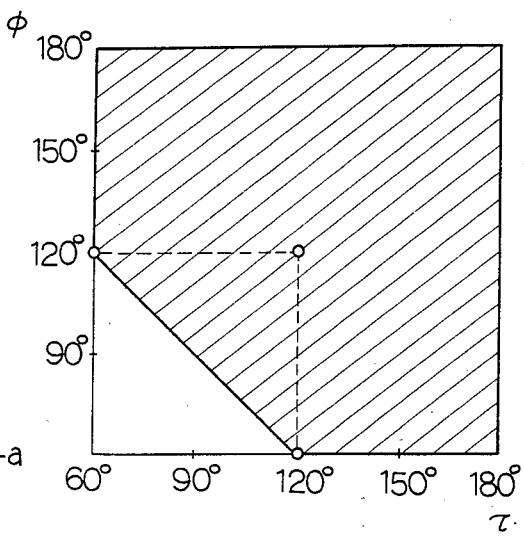
FIG. 6 is an orthogonal ordinate diagram showing a range of the arrangement angle $\tau$, $\phi$ which can be adopted in said measuring method.

A region satisfying said inequality (13) is shown by oblique lines in FIG. 5. However, since weights a, b can not be simultaneously 1, the point of a, b=1, 1 is excepted. This region satisfying said inequality (13) is transformed into a region of arrangement angles $\tau$, $\phi$ as shown in FIG. 6. Also in this case, since a and b can not be simultaneously 1, the point of $\tau$, $\phi=120°$, 120° is excepted. The calculation examples of weights a, b for several kinds of combination of $\tau$, $\phi$ are shown in Table 1.

TABLE 1

| $\phi$ $\tau$ | | 110 · | 115 · | 120 · | 125 · | 130 · |
|---|---|---|---|---|---|---|
| 110 · | a = | 1.4619 | 1.3289 | 1.2267 | 1.1472 | 1.0851 |
| | b = | 1.4619 | 1.2817 | 1.1305 | 1.0 | 0.8846 |
| 115 · | | 1.2817 | 1.1831 | 1.1064 | 1.0465 | 1.0 |
| | | 1.3289 | 1.1831 | 1.0572 | 0.9459 | 0.8452 |
| 120 · | | 1.1305 | 1.0572 | 1.0 | 0.9555 | 0.9216 |
| | | 1.2267 | 1.1064 | 1.0 | 0.9038 | 0.8152 |
| 125 · | | 1.0 | 0.9459 | 0.9038 | 0.8717 | 0.8480 |
| | | 1.1472 | 1.0465 | 0.9555 | 0.8717 | 0.7431 |
| 130 · | | 0.8846 | 0.8542 | 0.8152 | 0.7931 | 0.7779 |
| | | 1.0851 | 1.0 | 0.9216 | 0.8480 | 0.7779 |

In the practical determination of the value of $\tau$, $\phi$ it is desirable also from a viewpoint of precision measurement that the sensitivities of said three detecting elements 6 are almost the same. As obvious from the calculation examples shown in Table 1, it is desirable that the combination of $\tau$, $\phi$ is about 120°, about 120° and selected so that a, b may be near 1, 1.

Next, a method of measuring the central position of a hole (quantity of eccentricity) with high accuracy in the construction as described in FIG. 1 will be described.

Figure 7:
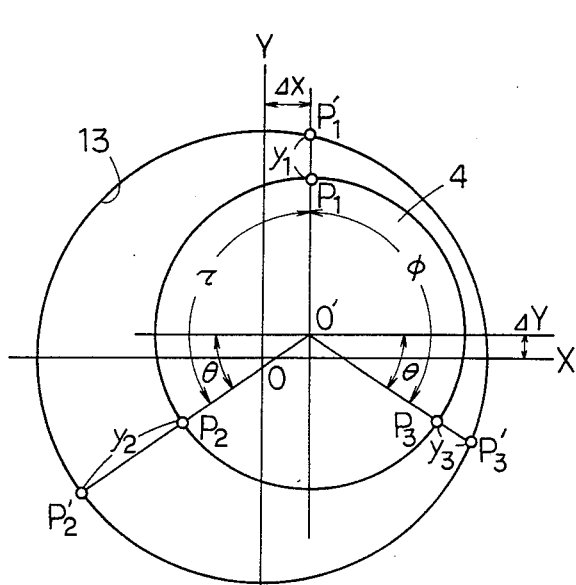
FIG. 7 is a diagram showing a measuring method of the central position of a hole.

Suppose that there is an eccentricity of $\Delta X, \Delta Y$ between the center 0 of the standard hole 13 and the center O' of a measuring apparatus 4 owing to the thermal displacement, positioning error and the like as shown in FIG. 7. Said body 4 of said measuring apparatus is provided with three detectors 5" arranged with holding the arrangement angles of $\tau$, $\phi$, the quantities of gaps between the inside diameter of the standard hole 13 and said detectors 5" (represented as $y_1 = P_1P'_1$, $y_2 = P_2P'_2$, $y_3 = P_3P'_3$) can be detected by means of said detectors.

In cases where the quantities of eccentricity $\Delta X, \Delta Y$ are given, Co-ordinates of each point of $P_1(X_1, Y_1)$, $P_2(X_2, Y_2)$, $P_3(X_3, Y_3)$, $P'_1(X'_1, Y'_1)$, $P'_2(X'_2, Y'_2)$, $P'_3(X'_3, Y'_3)$ can be analytically determined by the following equations of intersecting points of a circle with a straight line:

$$P_1(X_1, Y_1); X_1 = \Delta X, Y_1 = \Delta Y + r \tag{14}$$
$$P_2(X_2, Y_2); X_2 = -r \cos\theta + \Delta X$$
$$Y_2 = -r \sin\theta + \Delta Y$$
$$P_3(X_3, Y_3); X_3 = r \cos\theta + \Delta X$$
$$Y_3 = -r \sin\theta + \Delta Y$$

$$P'_1(X'_1, Y'_1); X'_1 = \Delta X, \tag{15}$$
$$Y'_1 = \sqrt{R^2 - \Delta X^2}$$
$$P'_2(X'_2, Y'_2);$$
$$X'_2 = \{c(c\Delta X - \Delta Y) -$$

-continued $$c\sqrt{(1+c^2)R^2 - (c\Delta X - \Delta Y)^2}\}/(1+c^2)$$
$$Y'_2 = \{c^2(c\Delta X - \Delta Y) -$$
$$c\sqrt{(1+c^2)R^2 - (c\Delta X - \Delta Y)^2}\}/(1+c^2) - c\Delta X + \Delta Y$$
$$P'_3(X'_3, Y'_3);$$
$$X'_3 = \{c(c\Delta X + \Delta Y) +$$
$$c\sqrt{(1+c^2)R^2 - (c\Delta X - \Delta Y)^2}\}/(1+c^2)$$
$$Y'_3 = \{-c^2(c\Delta X + \Delta Y) -$$
$$c\sqrt{(1+c^2)R^2 - (c\Delta X + \Delta Y)^2}\}/(1+c^2) + c\Delta X + \Delta Y$$

wherein r is a radius of the body 4 of a measuring apparatus, R being a radius of the reference hole 13, and $a_c$ being equal to tan $\theta$.

Next an X-axis component of the quantities of gaps $y_2$, $y_3$ will be investigated.

Provided that the following equation (16) and equation (17) hold good, the following equation (18) is deduced:

$$(y_2 - y_3)\cos\theta = \frac{2}{1+c^2}\Delta X + \tag{16}$$

$$\frac{1}{1+c^2}[\sqrt{(1+c^2)R^2 - (c\Delta X - \Delta Y)^2} -$$

$$\sqrt{(1+c^2)R^2 - (c\Delta X + \Delta Y)^2}]$$

$$(c\Delta X - \Delta Y)^2, (c\Delta X + \Delta Y)^2 << (1+c^2)R^2 \tag{17}$$

$$(y_2 - y_3)\cos\theta \approx \frac{2}{1+c^2}\Delta X \tag{18}$$

Accordingly, the following equation (19) is deduced:

$$\Delta X = \frac{1+c^2}{2}(y_2 - y_3)\cos\theta \tag{19}$$
$$= \frac{1}{2\cos\theta}(y_2 - y_3)$$

On the other hand, as to a Y-axis component of $y_1$, $y_2$, $y_3$, the following equation (20) is deduced:

$$(y_2 + y_3)\sin\theta = -2r\sin\theta + \frac{2c^2}{1+c^2}\Delta Y + \tag{20}$$

$$\frac{c}{1+c^2}[\sqrt{(1+c^2)R^2 - (c\Delta X + \Delta Y)} +$$

$$\sqrt{(1+c^2)R^2 - (c\Delta X - \Delta Y)^2}]$$

Provided that $(a_c\Delta X + \Delta Y)^2$, $(a_c\Delta X - \Delta Y)^2 << (1 + a_c^2)R^2$, the following equation (21) is deduced:

$$(y_2 + y_3)\sin\theta = -2r\sin\theta + \frac{2c^2}{1+c^2}\Delta Y + \frac{2c\sqrt{1+c^2}}{1+c^2}R \tag{21}$$

However, the following equation (22) holds good:

$$y = \sqrt{R^2 - \Delta X^2} - \Delta Y - r \quad (22)$$

Provided that $\Delta X << R$, the following equation (23) holds good:

$$y_1 = R - \Delta Y - r \quad (23)$$

As a result, the following equation (24) holds good:

$$R = y_1 + \Delta Y + r \quad (24)$$

The following equation is deduced by substituting said equation (21) by said equation (24):

$$(y_2 + y_3)\sin\theta = \left(\frac{2c^2}{1+c^2} + \frac{2c}{\sqrt{1+c^2}}\right)\Delta Y + 2y_1 \sin\theta$$

As a result, the following equation (25) holds good:

$$\Delta Y = \frac{\sqrt{1+c^2}}{2c + 2\sqrt{1+c^2}} [(y_2 + y_3) - 2y_1] \quad (25)$$

$$= \frac{1}{2(1+\sin\theta)} [(y_2 + y_3) - 2y_1]$$

It is found from said equations (19), (25) that if $y_1$, $y_2$, $y_3$ are detected by means of three detectors 5, the quantitites of eccentricity $\Delta X, \Delta Y$ can be detected regardless of a radius $R_o$ of the reference hole 13 and a radius r of the body 4 of a measuring apparatus.

If $\tau$ and $\phi$ are set to 125°, that is to say $\theta$ is set to 35° on the basis of the calculation examples shown in Table 1, the following equations (26 are deduced from said equations (19), (25):

$$\Delta X = 0.6104 (y_2 - y_3) \quad (26)$$

$$\Delta Y = 0.3117 [(y_2 + y_3) - 2y_1]$$

The quantities of eccentricity $\Delta X, \Delta Y$ can be calculated as soon as said body 4 of a measuring apparatus is inserted into said reference hole 13, by incorporating an operation circuit of said equation (26) in said operational amplifier circuit 10. The positioning error can be automatically corrected by the feedback of the obtained result to a numerical controlled apparatus (not shown) and an automatic correction of the zero point of the mechanical co-ordinate system of a machining center.

Figure 8A:
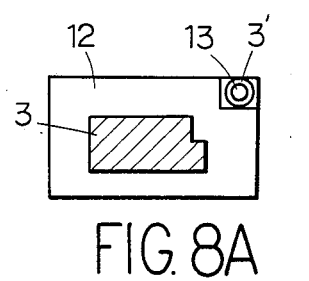
FIG. 8A is a plan showing the reference hole block fixedly mounted on a pallet.
Figure 8B:
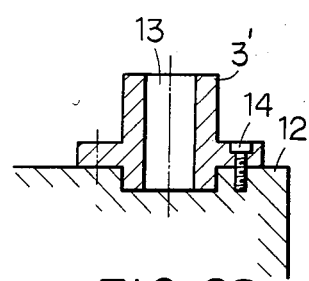
FIG. 8B is an partially enlarged side view showing the reference hole block fixedly mounted on a pallet.

The above described discrimination of pallets or articles to be worked by using a means for automatically measuring a diameter of hole is practiced in the following manner:

At first, the reference hole block 3' is fixedly mounted on one corner of a pallet 12 through known fixture members such as a setting bolt 14 so that they may not obstruct the fitting of an article 3 to be worked as shown in FIGS. 8A, 8B. According to a method of the present invention, the magnitude of a diameter of said reference hole block 3' is used as the distinguishing parameter of said pallet 12. That is to say, diameters of said reference hole blocks 3' are classified into several ranks as shown in Table 2 so that each of diameters of the holes A, B, C, D, E, F and G may correspond to each characteristic of said pallet 12.

TABLE 2

| Diameter of hole | |
|---|---|
| A | Pallet 1 |
| B | Pallet 2 |
| C | Pallet 3 |
| D | Pallet 4 |
| E | Pallet 5 |
| F | Pallet 6 |
| G | |

Figure 2:
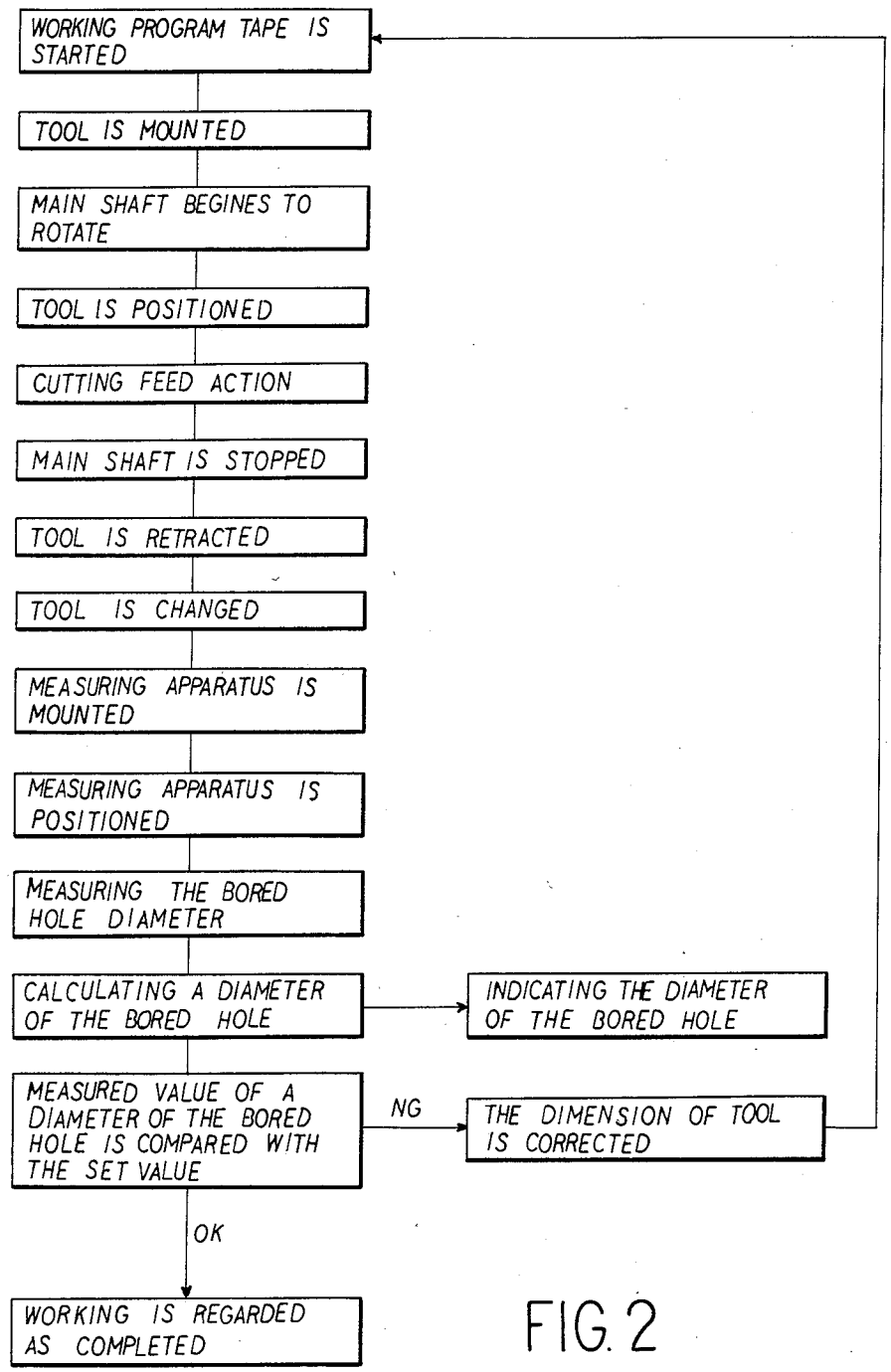
FIG. 2 shows a working program in cases where a method according to the present invention is applied to a working process of a bored hole.

In the discrimination of pallets, the body 4 of a measuring apparatus is mounted on the main spindle 1 in accordance with a measuring method as shown in FIG. 2 and a diameter of the standard hole placed on a pallet 12 is measured by means of said measuring apparatus. If said diameter of the spindle hole having the value between A and B is detected, the measured pallet 12 is judged to belong to the group of pallet 1 and the working program corresponding to the group of pallet 1 is automatically called, whereby an article 3 to be worked fixedly mounted on said pallet 12 is worked. The boundary value between the diameter of hole A and the diameter of hole B can be optionally set by a tolerance-setting faculty as shown in FIG. 2.

Although the preferred embodiment, in which a diameter of the spindle hole block fixedly mounted on a pallet is used as a parameter for distinguishing pallets, is above described, a method according to the present invention can be applied to a hole of an article 3 to be worked prior to working same.

What is claimed is:

1. An apparatus for automatically measuring an average diameter of a hole, comprising:
   a body having a distal end with a peripheral surface, and a tapered shaft insertable in a main spindle of a machining center;
   a plurality of displacement detecting elements provided in said body so as to be capable of being projected and retreated from said peripheral surface of said distal end of said body;
   a protection ring provided on said body and having a tapered surface cooperable with said displacement detecting elements, said protection ring being displaceable along an axial direction of said body;
   an elastic member mounted on an outside circumferential surface of said body and urging said protection ring forwardly of said body;
   an operational amplifier circuit provided in said body in operable connection with outputs of said plurality of displacement detecting elements;
   first connecting terminals provided on said body in operable connection with said operational amplifier circuit; and
   second connecting terminals, corresponding to said first connecting terminals, provided on said main spindle and in operable connection with a controller of said machining center;
   said first connecting terminals being urged into electrical contact with said second connecting terminals by a second elastic member provided on said body whereby said operational amplifier circuit is operatively connected with said controller.

2. A method of checking and distinguishing pallets by measuring the diameter of a hole thereof with an apparatus for measuring a diameter of a hole, said apparatus having a body, three displacement detecting elements mounted on said body and an operational amplifier circuit operably connected with said elements, comprising:

detecting the magnitude of a gap between each of three points on an inside circumferential surface of a reference hole block mounted on a pallet and the body of said apparatus, said magnitudes being respectively detected with each of said three displacement detecting elements;

calculating an average diameter of said hole with said operational amplifier circuit based upon said detected magnitudes; and distinguishing the pallet by discriminating said calculated average diameter's magnitude from among an ordered ranking of magnitudes of diameter corresponding to distinct known pallets.

3. A method of checking and distinguishing articles to be worked by measuring the diameter of a hole thereof with an apparatus for measuring a diameter of a hole, said apparatus having a body, three displacement detecting elements mounted on said body and an operational amplifier circuit operably connected with said elements, comprising:

detecting the magnitude of a gap between each of three points on an inside circumferential surface of a hole of an article to be worked and the body of said apparatus, said magnitudes being respectively detected with each of said three displacement detecting elements;

calculating an average diameter of said hole with said operational amplifier circuit based upon said detected magnitudes; and distinguishing the article to be worked by discriminating said calculated average diameter's magnitude from among an ordered ranking of magnitudes of diameter corresponding to distinct known articles to be worked.

4. A method of checking and distinguishing pallets with an apparatus for measuring the diameter of a hole, said apparatus having a body, three displacement detecting elements mounted on said body, a protecting ring provided on said body and having a first reference hole inside circumferential surface, and an operational amplifier circuit operably connected with said elements, comprising:

detecting the magnitude of a gap between each of three points on the inside circumferential surface of said first reference hole of said protection ring and the body of said apparatus, said magnitudes being respectively detected with each of said three displacement detecting elements;

calculating an average diameter of said first reference hole with said operational amplifier circuit based upon said detected magnitudes;

detecting the magnitudes of a gap between each of three points on an inside circumferential surface of a second reference hole of a reference hole block mounted on a pallet and the body of said apparatus, said magnitude being respectively detected with each of said three displacement detecting elements;

calculating an average diameter of said second reference hole with said operational amplifier circuit;

calculating the difference between said average diameter of said first reference hole and said second reference hole; and distinguishing the pallet on the basis of said calculated difference between said average diameters of said first reference hole and said second reference hole.

5. A method of checking and distinguishing articles to be worked with an apparatus for measuring the diameter of a hole, said apparatus having a body, three displacement detecting elements mounted on said body, a protection ring provided on said body and having a reference hole inside circumferential surface, and an operational amplifier circuit operably connected with said elements, comprising:

detecting the magnitude of a gap between each of three points on the inside circumferential surface of said reference hole of said protection ring and the body of said apparatus, said magnitudes being respectively detected with each of said three displacement detecting elements;

calculating an average diameter of said reference hole with said operational amplifier circuit based upon said detected magnitudes;

detecting the magnitudes of a gap between each of three points on an inside circumferential surface of a hole in an article to be worked and the body of said apparatus, said magnitude being respectively detected with each of said three displacement detecting elements;

calculating an average diameter of said hole in said article to be worked with said operational amplifier circuit;

calculating the difference between said average diameter of said reference hole and said hole in said article to be worked; and distinguishing the article to be worked on the basis of said calculated difference between said average diameters of said reference hole and said hole in said article to be worked.

* * * * *